United States Patent
Qu et al.

(10) Patent No.: US 10,212,014 B2
(45) Date of Patent: Feb. 19, 2019

(54) COMMUNICATION WITH I-Q DECOUPLED OFDM MODULATION

(71) Applicant: BlackBerry Limited, Waterloo (CA)

(72) Inventors: Shouxing Qu, Gloucester (CA); Dake He, Waterloo (CA); Stephen McCann, Southampton (GB)

(73) Assignee: BlackBerry Limited, Waterloo, Ontario (CA)

( * ) Notice: Subject to any disclaimer, the term of this patent is extended or adjusted under 35 U.S.C. 154(b) by 69 days.

(21) Appl. No.: 15/342,865

(22) Filed: Nov. 3, 2016

(65) Prior Publication Data

US 2018/0123856 A1    May 3, 2018

(51) Int. Cl.
  *H04L 27/26* (2006.01)
  *H04L 5/00* (2006.01)

(52) U.S. Cl.
  CPC ........ *H04L 27/2628* (2013.01); *H04L 5/0007* (2013.01); *H04L 27/265* (2013.01); *H04L 27/2657* (2013.01); *H04L 27/2662* (2013.01); *H04L 27/2675* (2013.01)

(58) Field of Classification Search
  None
  See application file for complete search history.

(56) References Cited

U.S. PATENT DOCUMENTS

| 9,998,315 | B2 * | 6/2018 | Qu | ........................ | H04L 27/364 |
| 2006/0224651 | A1 * | 10/2006 | Madhavapeddi | ..... | G06F 17/142 |
| | | | | | 708/404 |
| 2009/0323510 | A1 * | 12/2009 | Furrer | ................... | H04L 27/265 |
| | | | | | 370/210 |

OTHER PUBLICATIONS

Shouxing Qu, U.S. Appl. No. 15/063,954 entitled Method and Apparatus for I-Q Decoupled OFDM Modulation and Demodulation filed Mar. 8, 2016 (71 pages).
Windisch et al., On the Impact of I/Q Imbalance in Multi-Carrier Systems for Different Channel Scenarios, May 2007 (4 pages).
Interdigital Communications, IEEE 802.11-15/1314r2, Powerpoint Presentation, I/Q Imbalance Impact to TGax OFDMA Uplink Reception, Nov. 2015 (22 pages).
Shouxing Qu, U.S. Appl. No. 15/451,071 entitled Modulation Fora Data Bit Stream filed Mar. 6, 2017 (38 pages).
Shouxing Simon Qu, IEEE 802.11-16/0318r2, I-Q Decoupled OFDM Modulation, Mar. 2016 (28 pages).
European Patent Office, International Search Report and Written Opinion for PCT/EP2017/074797 dated Dec. 6, 2017 (15 pages).

* cited by examiner

*Primary Examiner* — Christopher P Grey
(74) *Attorney, Agent, or Firm* — Trop, Pruner & Hu, P.C.

(57) ABSTRACT

In some examples, an apparatus includes a transmitter configured to apply input data as a frequency-domain data sequence to modulate a set of subcarriers, and separate the frequency-domain data sequence into a first subsequence of elements and a second subsequence of elements. A first conjugate symmetric subsequence that is based on inserting a zero value into the first subsequence is formed, and a second conjugate symmetric subsequence that is based on inserting a zero value into the second subsequence is formed, where the zero values are inserted at different positions in the first and second subsequences. A time-domain sequence comprising a first component that is a function of the first conjugate symmetric subsequence, and a second component that is a function of the second conjugate symmetric subsequence is generated.

20 Claims, 8 Drawing Sheets

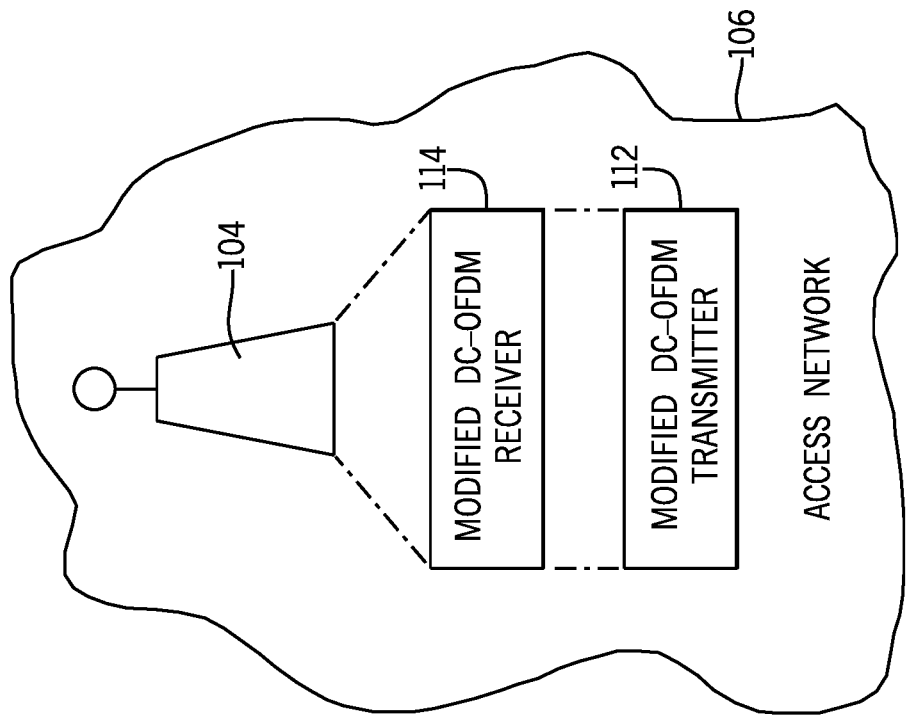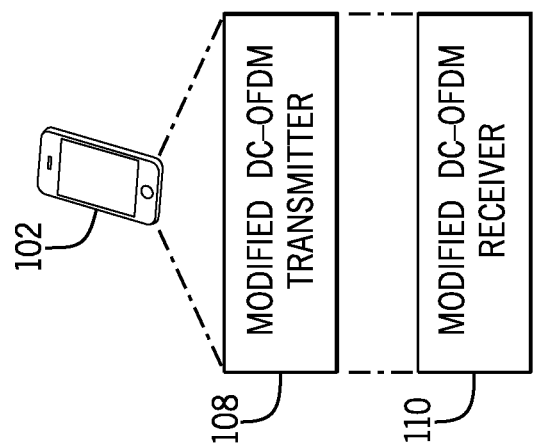
FIG. 1

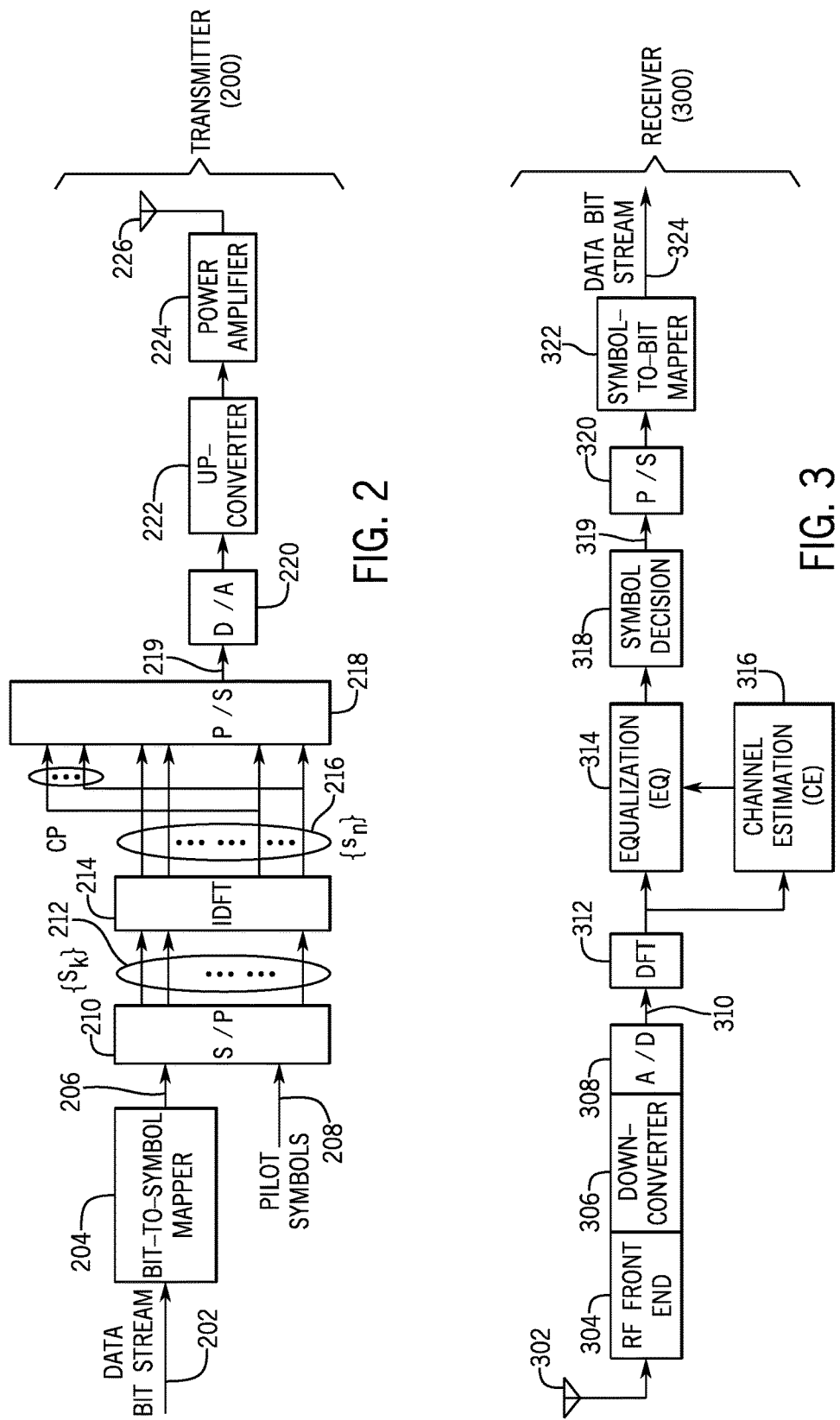

COMMUNICATION WITH I-Q DECOUPLED OFDM MODULATION

BACKGROUND

Devices such as computers, handheld devices, or other types of devices can communicate over wired or wireless networks. Wireless networks can include a wireless local area network (WLAN), which includes wireless access points (APs) to which devices are able to wirelessly connect. Other types of wireless networks include cellular networks that include wireless access network nodes to which devices are able to wirelessly connect.

BRIEF DESCRIPTION OF THE DRAWINGS

Some implementations of the present disclosure are described with respect to the following figures.

FIG. 1 is a block diagram of an example network arrangement including a wireless device and an access network according to some implementations.

FIG. 2 is a block diagram of an example transmitter that applies regular orthogonal frequency division multiplexing (OFDM) modulation.

FIG. 3 is a block diagram of an example receiver that applies regular OFDM demodulation.

DETAILED DESCRIPTION

Figure 4:
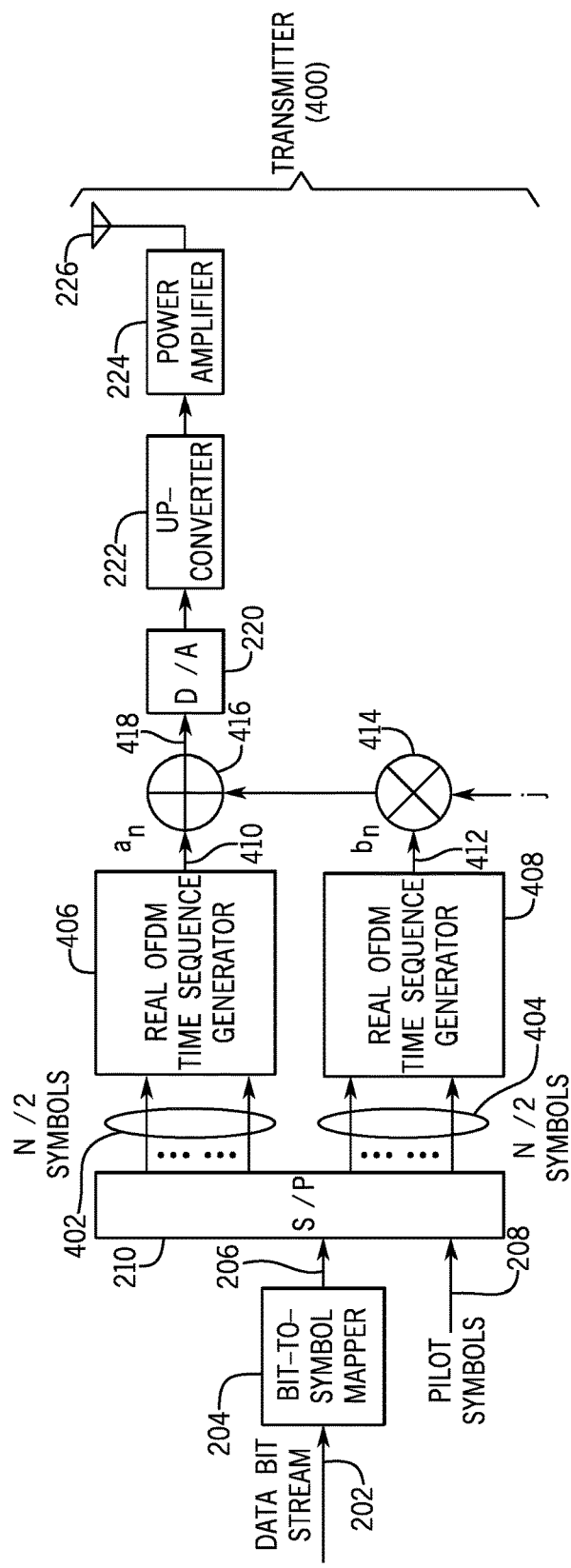
FIG. 4 is a block diagram of an example transmitter that applies I-Q decoupled OFDM (DC-OFDM) modulation.

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

To communicate data over a network (either a wired network or a wireless network), modulation is applied. Among various kinds of modulation schemes, orthogonal frequency division multiplexing (OFDM) modulation is a popular digital modulation scheme that has been adopted by various communication standards, including the Long-Term Evolution (LTE) standards provided by the Third Generation Partnership Project (3GPP) for wireless mobile communications. OFDM has also been adopted by the Institute of Electrical and Electronic Engineers (IEEE) 802.11 standard for use in wireless local area networks (WLANs).

Although reference is made to LTE and IEEE 802.11 standards, it is noted that in other examples, OFDM can be applied to other types of communications networks, such as 5$^{th}$ Generation (5G) and beyond cellular networks, other types of wireless networks, and/or wired networks.

In OFDM, the available radio frequency (RF) band is divided into multiple subcarriers (or equivalently, "tones") of respective different frequencies within the RF band, and each subcarrier is independently modulated with a same modulation scheme or different digital modulation schemes. Examples of digital modulation schemes that can be applied to subcarriers include Binary Phase Shift Keying (BPSK), M-ary PSK (MPSK), M-ary Quadrature Amplitude Modulation (M-QAM), and so forth.

FIG. 1 shows an example wireless network arrangement that includes a wireless device 102 that is able to communicate wirelessly with a wireless access network node 104 that is part of a wireless access network 106. In some examples, the wireless access network 106 can include a WLAN, and the wireless access network node 104 can include an access point (AP) that operates according to the IEEE 802.11 standards. In other examples, the wireless access network 106 can include a cellular access network, such as an LTE access network, a 5G access network, and so forth, and the wireless access network node 104 can be a cellular access network node, such as a base station or enhanced node B (eNodeB) or other type of cellular access network node.

The wireless device 102 can include any of the following: a desktop computer, a notebook computer, a tablet computer, a smart phone, a wearable device (e.g., a smart watch, smart eyeglasses, a head-mounted device, etc.), a sensor device, an appliance, a game console, a vehicle (or equipment in a vehicle), or any other type of electronic device.

The wireless device 102 includes a transmitter 108 and a receiver 110, and the wireless access network node 104 includes a transmitter 112 and a receiver 114. In FIG. 1, each of the transmitters 108 and 112 contains a modified DC-OFDM modulator and is referred to as a modified DC-OFDM transmitter, where "DC-OFDM" refers to I-Q (in phase-quadrature phase) decoupled OFDM. Similarly, each of the receivers 110 and 114 contains a demodulator to demodulate the modified DC-OFDM signal and is depicted as a modified DC-OFDM receiver. The modified DC-OFDM transmitters and receivers of FIG. 1 are able to apply a modified DC-OFDM modulation scheme according to some implementations, as described further below.

Although FIG. 1 depicts a wireless device 102 that communicates wirelessly in the wireless access network 106, it is noted that in other examples, techniques or mechanisms according to some implementations of the present disclosure can be applied to electronic devices that communicate over wired networks, where such electronic devices can include modified DC-OFDM transmitters and receivers as described herein for use in wired communications.

Generally, a modified DC-OFDM transmitter is able to generate an OFDM signal by applying DC-OFDM modulation to data for data communication over a communication medium (a wired or wireless medium), where an in-phase (I) component and a quadrature-phase (Q) component of the OFDM signal in the time domain are independently generated. That is, the I component is a function of a portion of the data, and the Q component is a function of another portion of the data. Furthermore, a few zero elements are inserted in frequency domain data subsequences to address the I-Q phase imbalance issue (discussed further below). Correspondingly, a modified DC-OFDM receiver is able to take advantage of these features of the DC-OFDM signal in the demodulation of data communicated over a communication medium, where the DC-OFDM demodulation is applied to a time-domain data sequence including an in-phase (I) component that is a function of a first frequency-domain subsequence that has two zero elements, and a quadrature-phase (Q) component that is a function of a second frequency-domain subsequence that has two zero elements.

FIG. 2 is a block diagram of a transmitter 200 that applies regular OFDM modulation (as opposed to a DC-OFDM modulation or a modified DC-OFDM modulation as described herein). A data bit stream 202 represents a sequence of data bits. More generally, the data bit stream 202 is the input data that is to be communicated over a communication medium. A bit-to-symbol mapper 204 maps the data bit stream 202 to a data symbol stream 206. Each data symbol of the data symbol stream 206 represents a respective group of one or more data bits of the input data bit stream 202, and the data symbols 206 collectively form a frequency-domain data sequence that is used to modulate a set of subcarriers (of different frequencies) that are used to communicate data over the communication medium.

The data symbols 206 are input, together with optional pilot symbols 208, to a serial-to-parallel switch 210, which converts an input serial data stream (including the data symbols 206 and optionally the pilot symbols 208) into a parallel output that includes a frequency-domain data sequence 212, represented as S={($S_k$)}, k=0, 1, ..., N−1 (where N>1). The frequency-domain data sequence 212 is used to modulate N subcarriers. Each data symbol 206 is a complex data symbol. In the foregoing, the frequency-domain data sequence 212 includes N complex data symbols. Each complex data symbol is a complex number that represents the data symbol in the frequency domain.

In practice in an OFDM system, a small number of the N subcarriers may be reserved to transmit the optional pilot symbols 208, which are predetermined, non-zero values and are known by the receiver, and can be used by the receiver to estimate channel characteristics. These pilot symbols are included and usually properly distributed in the frequency-domain sequence {$S_k$}.

To generate a baseband OFDM symbol, the frequency-domain data sequence 212 is transformed by an inverse discrete Fourier transform (IDFT) module (or operation) 214 into a time-domain data sequence 216, where the time-domain data sequence 216 is a sequence of time-domain complex symbols, represented as s={$s_n$}, n=0, 1, ..., N−1 (where N>1).

In the present disclosure, the term "module" can refer to a hardware processing circuit, such as any or some combination or some portion of the following: a microprocessor, a core of a multi-core microprocessor, a microcontroller, a programmable gate array, a programmable integrated circuit device, or another hardware processing circuit. In further examples, the term "module" can refer to a combination of a hardware processing circuit and machine-readable instructions executable on the hardware processing circuit.

The IDFT applied by the IDFT module 214 is represented as follows:

$$s_n \equiv IDFT\{S_k\} = \frac{1}{N}\sum_{k=0}^{N-1} S_k \exp\left(j\frac{2\pi kn}{N}\right), \quad \text{(Eq. 1)}$$

$$n = 0, 1, \ldots, N-1 \text{ (where } N > 1\text{)}.$$

In Eq. 1, $S_k$ specifies the signal magnitude and phase of the k-th subcarrier at frequency $f_k$=k/NT Hertz (Hz), where T stands for the symbol interval (excluding the cyclic prefix (CP)). The time-domain sequence {$s_n$} after padding the CP sequence is input to a parallel-to-serial switch 218, which produces a serial output sequence 219 based on the parallel input data (including the time-domain sequence {$s_n$} padded with the CP sequence). The serial output sequence 219 is converted by a digital-to-analog (D/A) converter 220 to an analog signal and up-converted by an up-converter 222 to the RF band with the carrier frequency $f_c$.

In general, each time-domain number of {$s_n$} generated by Eq. 1 is a complex number and can be expressed as $$s_n = a_n + jb_n \quad \text{(Eq. 2)}$$

where $a_n$ and $b_n$, both real numbers, are the in-phase (I) and quadrature-phase (Q) components of $s_n$, respectively. Note that the I and Q components of the time-domain sequence are jointly determined by the same frequency-domain data sequence {$S_k$} in Eq. 1 and thus they are not independent each other.

The RF signal with the carrier frequency $f_c$ is amplified by a power amplifier 224, before being transmitted by an antenna 226 of the transmitter 200.

FIG. 3 is a block diagram of an example receiver 300 used for demodulation in regular OFDM (rather than for demodulation in DC-OFDM or modified DC-OFDM discussed further below). An OFDM modulated signal generated and transmitted by the transmitter 200 of FIG. 2 is received through an antenna 302 of the receiver 300 of FIG. 3. The receiver 300 generally performs the reverse operations of the operations performed by the transmitter 200 in order to recover the original data bit stream (202).

The receiver 300 can include an RF front end 304 that includes circuitry to receive the OFDM modulated signal (transmitted by the transmitter 200 of FIG. 2) from the antenna 302. A down-converter 306 down converts the received OFDM modulated signal from an RF band to a base band. An analog-to-digital (A/D) converter 308 converts the down converted analog signal to a discrete time-domain data sequence 310, {$s_n$}. Ideally, corresponding to Eq. 1, the frequency-domain data sequence {$S_k$} then can be recovered from the time-domain sequence {$s_n$} by applying a discrete Fourier transform (DFT) by a DFT module 312, according to:

$$S_k \equiv DFT\{s_n\} = \sum_{n=0}^{N-1} s_n \exp\left(-j\frac{2\pi kn}{N}\right), \quad \text{(Eq. 3)}$$

$$k = 0, 1, \ldots, N-1 \text{ (where } N > 1\text{)}.$$

However, in reality, the received signal usually is somehow distorted because of the non-ideal characteristics of the communication medium, which results in inter-symbol interference (ISI). The distortion can be (at least partially) removed in the receiver 300 by the process of equalization (EQ) applied by an equalizer 314 after the DFT, assuming that channel state information (CSI) is available to the equalizer 314. To do so, the received pilot symbols are used for channel estimation (CE) by a channel estimator 316, which provides equalization with an estimated CSI. The estimated CSI can then be utilized by the equalizer 314 to reduce, or in some cases remove, the distortion.

After distortion is reduced or removed by the equalizer 314, a symbol decision operation is performed by a symbol decider 318. In the symbol decision operation, the symbol carried by each subcarrier is detected, or decided, by comparing the symbol value with a symbol constellation used by the subcarrier in the transmitter 200. A symbol constellation represents the possible symbol values that can be used to modulate subcarriers. The symbol decider 318 makes a decision on which symbol of the constellation was most likely transmitted. The decided symbols 319 output by the symbol decider 318 can then be sequentially output by a parallel-to-serial switch 320, and sequentially mapped by a symbol-to-bit mapper 322 to generate a data bit stream 324 (which corresponds to the data bit stream 202 to be transmitted by the transmitter 200 of FIG. 2).

The following properties of DFT/IDFT will be used later in this document.

The linearity property of IDFT and DFT is expressed as:

$$\text{IDFT}\{p_n\} + \text{IDFT}\{q_n\} = \text{IDFT}\{p_n + q_n\} \quad \text{(Eq. 4a)}$$

and $$\text{DFT}\{p_n\} + \text{DFT}\{q_n\} = \text{DFT}\{p_n + q_n\} \quad \text{(Eq. 4b)}$$

where each of $\{p_n\}$ and $\{q_n\}$ is a sequence of real or complex numbers.

From Eq. 2, the sequence of $\{s_n\}$ is a real sequence if and only if $\{S_k\}$ is a conjugate symmetric sequence (CSS), also called a Hermitian symmetric sequence, that is, $$S_k = S_{N-k}^* \text{ for } k=0,1,\ldots,N-1 \text{ (where } N>1\text{).} \quad \text{(Eq. 5a)}$$

In Eq. 5a, the subscript of $S_{N-k}^*$ follows the rule of modulo N operation. For instance, with k=0, N− k=N modulo N=0, because the frequency axis is cyclically repeated in digital signal processing.

In particular, if $\{S_k\}$ is a conjugate symmetric sequence, then for k=0 and k=N/2, $S_0 = S_0^*$ and $S_{N/2} = S_{N/2}^*$, implying that both are real numbers, i.e., $$\text{Im}(S_0) = \text{Im}(S_{N/2}) = 0 \quad \text{(Eq. 5b)}$$

where Im(x) represents the imaginary part of x.

From Eq. 3, it can be shown that $$\text{DFT}\{s_n^*\} = S_{N-k}^* \quad \text{(Eq. 6)}$$

where * stands for complex conjugate.

I-Q Imbalance Issue

An issue with regular OFDM modulation is that, after a series of processes and propagation, when the signal is received by the receiver and is down-converted to the baseband time sequence, the ratio between the I-component and the Q-component of $s_n$ has been changed, resulting in a phenomenon referred to as I-Q imbalance.

In practice, I-Q imbalance may be introduced by, for example, the up-converter 222 and the RF power amplifier 224 in the transmitter 200 of FIG. 2, as well as the down-converter 306 in the receiver 300 of FIG. 3, due to unbalanced gains between the in-phase branch and the quadrature-phase branch.

As a result, when the transmitted time-domain sequence is given by Eq. 2, the time-domain baseband sequence received in the receiver may be expressed as $$\tilde{s}_n = c_I a_n + j c_Q b_n \quad \text{(Eq. 7)}$$

where $c_I$ and $c_Q$ represent the gains of the I-branch and the Q-branch respectively. I-Q imbalance occurs when $c_I \neq c_Q$. In general, $c_I$ and $c_Q$ are complex numbers, that is, $$c_I = \gamma_I e^{j\theta_I}, \quad \text{(Eq. 8)}$$

and $$c_Q = \gamma_Q e^{j\theta_Q}, \quad \text{(Eq. 9)}$$

where $\gamma_I > 0$ and $\gamma_Q > 0$, as well as $\theta_I$ and $\theta_Q$, are real numbers. I-Q magnitude imbalance occurs if $\gamma_I \neq \gamma_Q$, and I-Q phase imbalance occurs if $\theta_I \neq \theta_Q$, where $\theta_I$ represents the phase offset of the in-phase component, and $\theta_Q$ represents the phase offset of the quadrature component. A special case is $\theta_I = \theta_Q \neq 0$, which means an equal phase offset in both the I and Q components. A direct effect of phase imbalance in the time-domain is the resultant interference between the real and imaginary components of the received signal. For convenience, Eq. 7 can be rewritten in a form of $$\tilde{s}_n = \frac{c_I + c_Q}{2}(a_n + jb_n) + \frac{c_I + c_Q}{2}(a_n - jb_n) = \alpha s_n + \beta s_n^*, \quad \text{(Eq. 10)}$$

where $\alpha$ and $\beta$ are complex numbers, $$\alpha = (c_I + c_Q)/2, \quad \text{(Eq. 11)}$$

and $$\beta = (c_I - c_Q)/2. \quad \text{(Eq. 12)}$$

To see the impact of the I-Q imbalance on regular OFDM in the frequency domain, one can apply a DFT to Eq. 10 yielding, $$\tilde{S}_k = \text{DFT}\{\tilde{s}_n\} = \alpha S_k + \beta S_{N-k}^* \quad \text{(Eq. 13)}$$

To obtain Eq. 13, the property of Eq. 6 has been used. In the right-hand side of Eq. 13, while the first term ($\alpha S_k$) represents the desired data information, the second term ($\beta S_{N-k}^*$) represents interference, where $\{S_{N-k}^*\}$ is an image of the data sequence $\{S_k\}$, and therefore is referred to as image leakage (IL).

In the frequency domain, when I-Q imbalance occurs in an OFDM system, the received data sequence is a linear combination of the desired data sequence and its image sequence, which is a sort of inter-subcarrier interference. In multi-user (MU) OFDM Access (OFDMA) applications, this may further result in interference between different users due to the fact that the image signal has the potential to cause interference to another user allocated to those same sub-carriers in which the image appears. An MU application refers to an OFDM application in which different sets of subcarriers are allocated to different users (or more specifically, different wireless devices) at the same time.

DC-OFDM Transmitters and Receivers

Figure 5:
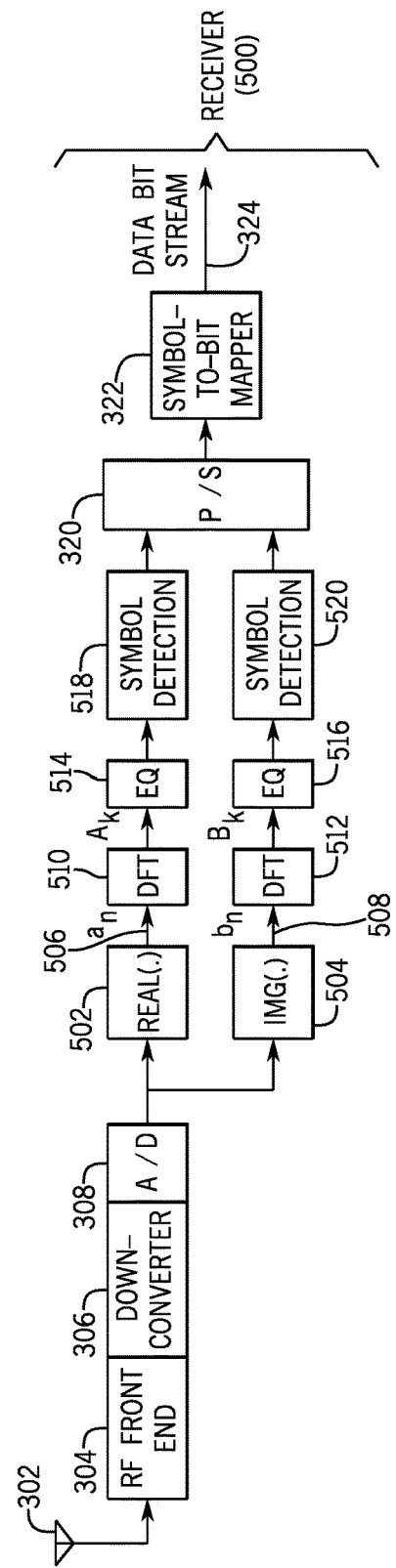
FIG. 5 is a block diagram of an example receiver that applies DC-OFDM demodulation.

FIGS. 4 and 5 depict examples of a transmitter 400 and a receiver 500, respectively, that can be used to address the I-Q magnitude imbalance issue discussed above. FIGS. 4 and 5 provide examples of application of DC-OFDM to address the I-Q magnitude imbalance issue. The transmitter 400 is a DC-OFDM transmitter that applies DC-OFDM modulation, and the receiver 500 is a DC-OFDM receiver that performs demodulation of DC-OFDM signal.

Note that FIGS. 4 and 5 do not address the I-Q phase imbalance issue, which can be addressed using the modified DC-OFDM techniques discussed further below in conjunction with FIGS. 6-10. In FIGS. 4 and 5, components that perform similar tasks as respective components in FIGS. 2 and 3 are labelled with the same reference numerals.

In the transmitter 400 depicted in FIG. 4, the frequency-domain data sequence $S = \{S_k\}$, k=0, 1, ..., N−1 is divided into two disjointed subsequences 402 and 404, each with half (N/2) of the numbers, or elements, of the frequency-domain data sequence $\{S_k\}$. The first subsequence 402 (including N/2 symbols) is input into a first real OFDM time sequence generator 406, and the second subsequence 404 (including N/2 symbols) is input into a second real OFDM time sequence generator 408. The real OFDM time sequence generator 406 generates a first time-domain OFDM sequence 410, and the second real OFDM time sequence generator 408 generates a time-domain OFDM sequence 412. The two time-domain OFDM sequences 410 and 412 are independent of each other, and each includes real values.

To generate the first real OFDM time-domain sequence 410 (by the generator 406) for an OFDM symbol, half of the data symbols, e.g., $S_k$, $$k = 0 \sim \left(\frac{N}{2} - 1\right),$$

are taken and extended into a conjugate symmetric sequence (CSS) denoted as $A=\{A_k\}$, $k=0 \sim N-1$, as specified by Eqs. 5a and 5b. Applying an IDFT on $\{A_k\}$ yields a real OFDM time sequence 410 (denoted as $a=\{a_n\}$, $n=0 \sim N-1$). The generator 408 performs the same operation except it works on the remaining half of the data symbols, e.g., $S_k$, $$k = \frac{N}{2} \sim (N-1).$$

The associated CSS and the resultant real time sequence are denoted as $B=\{B_k\}$ and $b=\{b_n\}$ respectively. Following the properties of DFT/IDFT of Eq. 5b, in each of the two conjugate symmetric sequences, the first number (e.g., $A_0$ in A) and the N/2-th number (e.g., $A_{N/2}$ in A) are real, while others can be complex.

The second time sequence $\{b_n\}$ 412 is multiplied by the imaginary unit, $j=\sqrt{-1}$, by a multiplier 414, and added to the first time sequence $\{a_n\}$ 410 by an adder 416 to form a complex time-domain sequence 418 ($s_n = a_n + jb_n$), represented by Eq. 2. The complex time-domain sequence 418 is then processed by the components 220, 222, and 224 in sequence, for transmission by the antenna 226.

In the receiver 500 of FIG. 5, the received signal after A/D conversion by the A/D converter 308 is a complex baseband time-domain sequence. Assume that the received signal does not experience phase offset nor phase imbalance, or any phase offset or phase imbalance has been corrected with certain proper processing (not shown in the figure), the real component 502 and imaginary component 504 of the complex baseband time-domain sequence are split into two separate real sequences 506 and 508, and each one is then processed individually as an independent regular OFDM signal with operations including DFT (by a respective DFT module 510 or 512), equalization (by a respective equalizer 514 or 516), and symbol detection (by a respective symbol detector 518 or 520).

The outputs of the symbol detectors 518 and 520 are converted from a parallel format to a serial output by the parallel-to-serial switch 320, and processed by a symbol-to-bit mapper 322 to form a data bit stream 324.

Below is an example to illustrate the concept of DC-OFDM signals.

Assume the following eight-point frequency-domain data sequence including elements selected from 16-QAM symbols (each subcarrier is modulated using 16-QAM modulation), $$S=[3+j,-3-j,3-3j,3-3j,-1-3j,3+3j,-3-j,-1-j],$$

from which an eight-point DC-OFDM time-domain data sequence is to be generated in the transmitter 400.

The following are tasks to produce, by the transmitter 400 of FIG. 4, the DC-OFDM time-domain data sequence from the example frequency-domain data sequence set forth above.

Task 1: The frequency-domain data sequence S is split into two non-overlapped subsequences each with N/2 elements (402 and 404 in FIG. 4), $$A=[3+j,-3-j,3-3j,3-3j],$$

and $$B=[-1-3j,3+3j,-3-j,-1-j],$$

where A can include any four numbers of S, and B can include the remaining four numbers.

Task 2: In each of A and B, the real OFDM time sequence generator 406 or 408 removes the imaginary part of the first number (the $0^{th}$ element of each subsequence A or B) and pads the removed imaginary part to the end of the subsequence, to form, respectively:

$$A'=[3,-3-j,3-3j,3-3j,1]$$

and $$B'=[-1,3+3j,-3-j,-1-j,-3].$$

This makes $Im(A_0)=Im(A_{N/2})=Im(B_0)=Im(B_{N/2})=0$ to satisfy Eq. 5b.

It should be noted that this is an example to illustrate a possible way, but not the only way, to satisfy the condition of Eq. 5b. More generally, the $0^{th}$ element and the $(N/2-1)^{th}$ element of each subsequence (A or B) can be any real numbers to satisfy Eq. 5b.

Task 3: The generator 406 or 408 then extends each of A' and B' to an 8-point conjugate symmetric sequence (CSS) as indicated by Eq. 5a, such that $$A''=[3,-3-j,3-3j,3-3j,1,3+3j,3+3j,-3+j]$$

and $$B''=[-1,3+3j,-3-j,-1-j,-3,-1+j,-3+j,3-3j].$$

Eq. 5a is set forth below.

$$S_k = S_{N-k}^* \text{ for } k=0,1,\ldots,N-1. \qquad \text{(Eq. 5a)}$$

In the subsequences A'' and B'', the indexes are from 0 to N-1 (i.e., from 0 to 7 in the example). Thus, for A'', $A_0=3$, $A_1=-3-j$, ..., $A_7=-3+j$. $A_1$ is symmetric to $A_7$, $A_2$ is symmetric to $A_6$ ..., and so on, consistent with the condition of Eq. 5a. Note also that $A_4$ is symmetric to $A_4$, and $A_0$ is symmetric to $A_8=A_0$.

More generally, each conjugate symmetric sequence (A'' and B'') is generated based on the elements of the respective subsequence (A' and B') including the modified $0^{th}$ element and the added new element.

Task 4: The generator 406 or 408 applies an 8-point IDFT on A and B individually to output two 8-point real time-domain data sequences denoted as a and b, respectively.

Task 5: The final complex time sequence is computed as $s=a+jb$.

Alternatively, because of the linearity of the IDFT, tasks 4 and 5 can be changed as follows:

Task 4: Form the complex sequence $S=A+jB$.

Task 5: Apply 8-point IDFT on S to yield $s=a+jb$.

Compared to regular OFDM, DC-OFDM is more robust to I-Q imbalance. The reason is because of the conjugate symmetry in each of the sequences A'' and B''. For instance, in the above example, after Task 3, $$A''=[3,-3-j,3-3j,3-3j,1,3+3j,3+3j,-3+j].$$

Consider any term, say, the term of $A_1=-3-j$. From Eq. 13, when I-Q imbalance occurs, the received value of $A_1$ is interfered by $A_7^*$, but $A_7^*=-3-j$ which is equal to $A_1$. Thus, the interference due to I-Q imbalance is the same as the desired signal. In other words, it is not an interference any more; it becomes a useful and desired part of the signal.

This is a unique feature provided by DC-OFDM only, since only with DC-OFDM is each of A" and B" a conjugate symmetric sequence. In contrast, with regular OFDM, the data symbols transmitted by different subcarriers are independent without such property of conjugate symmetry. DC-OFDM is also applicable to each user involved in MU OFDMA applications, in which subcarriers are shared by multiple users. To use DC-OFDM for MU applications, the subcarriers allocated to each user are of symmetric pairs, that is, if the k-th subcarrier is allocated to a user, the (N−k)-th subcarrier is also allocated to the same user. Furthermore, each symmetric pair is modulated by a data symbol and its conjugate, as indicated by Eq. 5a.

In the receiver 500 illustrated in FIG. 5, the real and imaginary components 502 and 504 of the received signal are separated and demodulated individually. This is possible only if the received signal does not experience phase offset nor phase imbalance. However, in reality, phase offset (i.e., $\theta_I=\theta_Q\neq 0$) or phase imbalance (i.e., $\theta_I\neq\theta_Q$) is often unavoidable, and thus separation of the real component and the imaginary component (i.e., $a_n$ and $b_n$ in Eq. 2) of the received signal is not possible unless the phase offset or phase imbalance is corrected by proper processing. While the phase offset problem in general is a normal aspect of propagation, and can be removed by equalization, the solution to solve the I-Q phase imbalance problem (i.e., $\theta_I\neq\theta_Q$) is the focus of the modified DC-OFDM techniques discussed further below.

Modified DC-OFDM Transmitters

The modified DC-OFDM modulation/demodulation is a modified version of the DC-OFDM modulation/demodulation techniques discussed above, for addressing the I-Q phase imbalance issue.

More specifically, consider a complex sequence in the time domain such as represented by Eq. 2, $s_n=a_n+jb_n$. From Eqs. 7-12, when I-Q imbalance occurs, the received signal becomes $$\tilde{s}_n=u_n+jv_n, \qquad \text{(Eq. 14)}$$

where $$u_n=Re(\tilde{s}_n)=\gamma_I a_n \cos\theta_I-\gamma_Q b_n \sin\theta_Q \qquad \text{(Eq. 15)}$$

and $$v_n=Im(\tilde{s}_n)=\gamma_I a_n \sin\theta_I+\gamma_Q b_n \cos\theta_Q, \qquad \text{(Eq. 16)}$$

where Re(x) denotes the real component of x, both $\{u_n\}$ and $\{v_n\}$ are real sequences, $n=0\sim(N-1)$ for each OFDM symbol. Eqs. 15 and 16 can be expressed in matrix form, $$\begin{bmatrix} u_n \\ v_n \end{bmatrix} = \begin{bmatrix} \cos\theta_I & -\sin\theta_Q \\ \sin\theta_I & \cos\theta_Q \end{bmatrix} \begin{bmatrix} \gamma_I a_n \\ \gamma_Q b_n \end{bmatrix}. \qquad \text{(Eq. 17)}$$

As indicated by Eqs. 15-17, each of the real and imaginary components of the received signal, $u_n$ and $v_n$, is a mixture of $a_n \cos\theta_I$ and $b_n \sin\theta_Q$. As a result, the real component $a_n$ and the imaginary component $b_n$ of the original signal cannot be obtained by simply splitting the real component $u_n$ and the imaginary component $v_n$ of the received signal $\tilde{s}_n$. Solutions have to be applied to estimate $\theta_I$ and $\theta_Q$ and then remove their impact. The problem of how to estimate $\theta_I$ and $\theta_Q$ and remove their impact in the receiver is addressed by using the modified DC-OFDM techniques discussed below.

In accordance with some implementations of the present disclosure, the modified DC-OFDM techniques address the I-Q phase imbalance issue for a DC-OFDM signal, i.e., for independent estimation of $\theta_I$ and $\theta_Q$ and removal of the impacts of the I-Q phase imbalance in the modified DC-OFDM receiver.

The proposed solution has two parts: 1) a change of the DC-OFDM signal generated in the transmitter, and 2) new approaches for estimation of $\theta_I$ and $\theta_Q$ by the receiver in the received signal. The proposed solution is directed to DC-OFDM rather than to regular OFDM.

Figure 6:
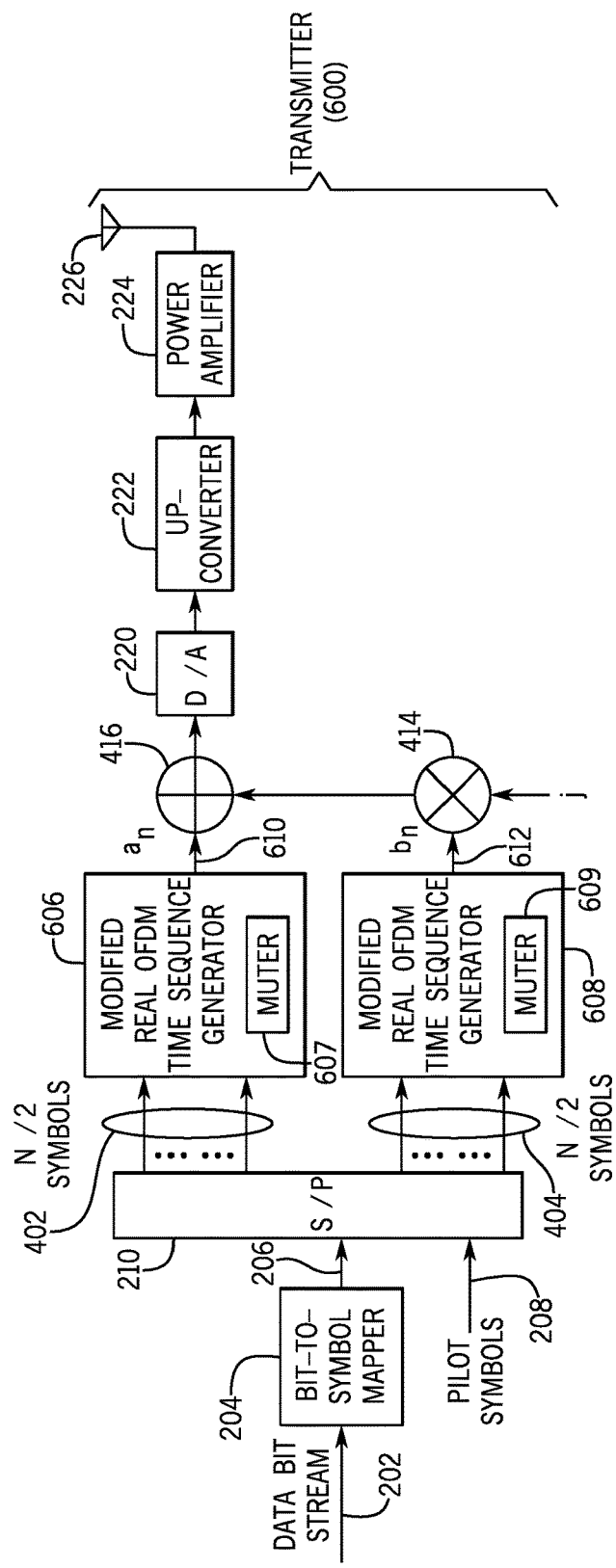
FIG. 6 is a block diagram of an example transmitter that applies modified DC-OFDM modulation according to some implementations.

As discussed above, to generate a DC-OFDM symbol in the transmitter 400 of FIG. 4, two conjugate symmetric sequences A and B are constructed in the frequency domain, each of them satisfying Eqs. 5a and 5b. FIG. 6 shows a transmitter 600 that has been modified from the transmitter 400 of FIG. 4. The transmitter 600 includes modified real OFDM time sequence generators 606 and 608, which perform similar tasks as the generators 406 and 408 of FIG. 4, except that each generator 606 and 608 also includes a respective muter 607 and 609 that performs a respective muting. When the sequences A and B are constructed by the respective generators 606 and 608 in the transmitter 600, one subcarrier (denoted as the $k_1$-th subcarrier) in A and another subcarrier (denoted as the $k_2$-th subcarrier) in B are muted (i.e., set to zero), that is, the following condition is applied:

$$\begin{cases} A_{k_1}=0, A_{k_2}\neq 0 \\ B_{k_1}\neq 0, B_{k_2}=0 \end{cases}, \qquad \text{(Eq. 18a)}$$

where $k_2\neq k_1$, $0\leq k_1\leq N/2$ and $0\leq k_2\leq N/2$.

More generally, a first conjugate symmetric subsequence is formed from a first frequency-domain subsequence based on inserting a zero value into the first frequency-domain subsequence, and a second conjugate symmetric subsequence is formed from a second frequency-domain subsequence based on inserting a zero value into the second frequency-domain subsequence, where the zero values are inserted at different positions in the first and second subsequences (the $k_1$-th subcarrier in the first subsequence A and the $k_2$-th subcarrier in the second subsequence B, where $k_2\neq k_1$).

Figure 7:
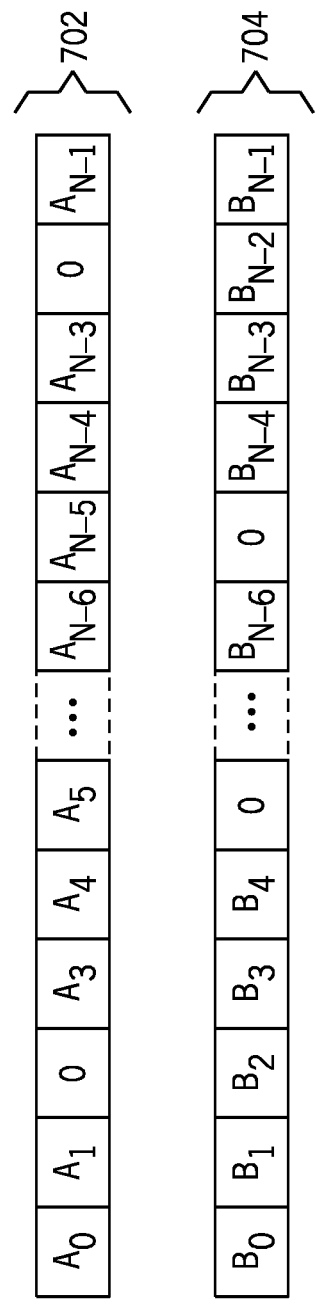
FIG. 7 illustrates insertion of zero values into frequency-domain subsequences according to some implementations.

FIG. 7 shows an example of a first subsequence A (702) in which a zero value has been inserted at the $k_1$-th subcarrier in A, where $k_1=2$, and a second subsequence B (704) in which a zero value has been inserted at the $k_2$-th subcarrier in B, where $k_2=5$. Note that since $A_2=0$ and $B_5=0$, $A_{N-2}$ and $B_{N-5}$ are also zeros in A and B, respectively, because of the conjugate symmetry.

Eq. 18a does not specify particular values $A_{k_2}$ and $B_{k_1}$ should take. As explained in detail in the next section, for applications in an environment with noise, $A_{k_2}$ and $B_{k_1}$ should take values preferably with large magnitude in order to maintain good performance. As demonstrated later, for the purpose of estimating $\theta_I$ and $\theta_Q$, the receiver does not have to know $A_{k_2}$ and $B_{k_1}$.

After the muting has been applied on each of A and B to form modified subsequences A and B, respectively, the modified subsequences A and B can be extended to form respective conjugate symmetric sequences (as discussed above in connection with FIG. 4), to form respective time-domain OFDM sequences 610 and 612 by the modified real OFDM time sequence generators 606 and 608, respectively. The time-domain OFDM sequence 610 forms the in-phase (I) component ($a_n$) that is a function of the conjugate symmetric sequence (A) only, while the time-domain OFDM sequence 612 forms the quadrature-phase (Q) component ($b_n$) that is a function of the conjugate symmetric sequence (B) only.

The trade-off with using modified DC-OFDM modulation is that the four subcarriers with muting can no longer be used for data transmission, representing an overhead cost (four out of N subcarriers for each OFDM symbol). In many OFDM applications, often N is much greater than four. For instance, in the IEEE 802.11ax Amendment (D0.1), N is from 64 to 256, while in the IEEE 802.11ad amendment, N=355. Thus, the overhead is negligibly small in such applications.

Figure 8:
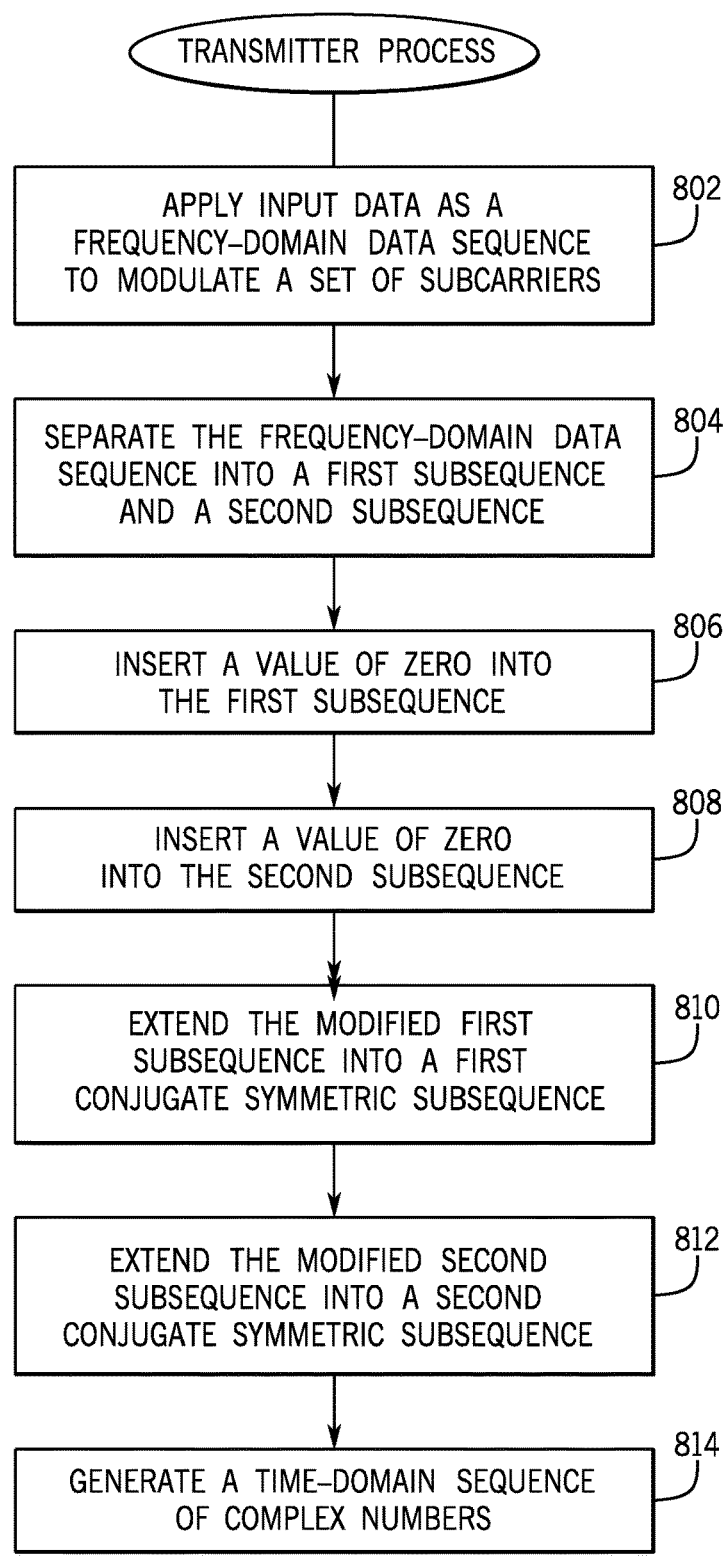
FIG. 8 is a flow diagram of an example process of a transmitter according to some implementations.

FIG. 8 is a flow diagram of an example process that can be performed by the transmitter 600 according to some implementations. The transmitter 600 applies (at 802) input data (e.g., the data bit stream 202) as a frequency-domain data sequence to modulate a set of subcarriers. This is performed by the bit-to-symbol mapper 204, for example. The transmitter 600 then separates (at 804) the frequency-domain data sequence into a first subsequence and a second subsequence. The muter 607 in the generator 606 inserts (at 806) a value of zero into the first subsequence to form a modified first subsequence, and the muter 609 of the generator 608 inserts (at 808) a value of zero into the second subsequence to form a modified second subsequence. The zero values are inserted at different (i.e., misaligned) positions in the first and second subsequences, such as according to Eq. 18a above.

The generator 606 extends (at 810) the modified first subsequence into a first conjugate symmetric subsequence, and the generator 608 extends (at 812) the modified second subsequence to a second conjugate symmetric subsequence. The transmitter 600 then generates (at 814) a time-domain sequence of complex numbers that include a real component that is a function of the first conjugate symmetric subsequence only, and an imaginary component that is a function of the second conjugate symmetric subsequence only.

Modified DC-OFDM Receivers

Figure 9:
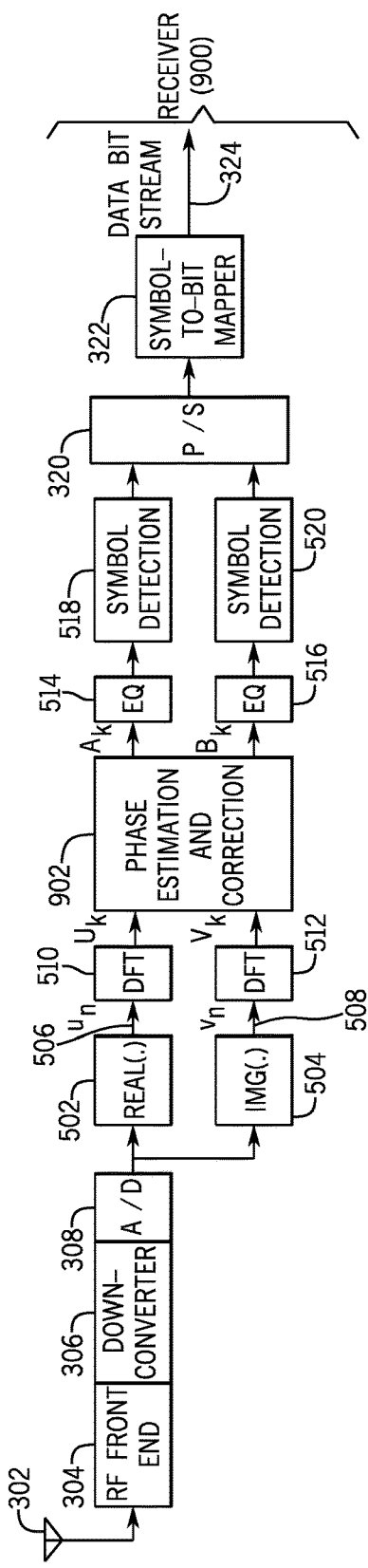
FIGS. 9 and 10 are block diagrams of example receivers that apply modified DC-OFDM demodulation according to some implementations.
Figure 10:
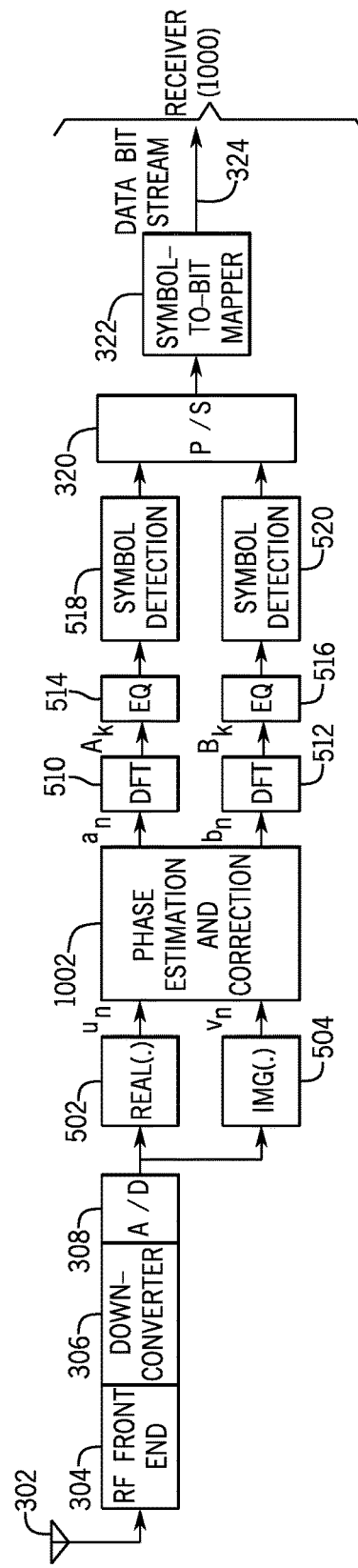

FIGS. 9 and 10 illustrate two different examples of a modified DC-OFDM receiver 900 or 1000, respectively. Each of the receivers 900 and 1000 is similar to the DC-OFDM receiver 500 of FIG. 5, except that the receiver 900 or 1000 adds a phase estimation and correction module 902 or 1002, respectively. The phase estimation and correction module 902 in the receiver 900 for estimating $\theta_I$ and $\theta_Q$ is implemented in the frequency domain (i.e., performed after the DFT applied by the DFT module 510 or 512, respectively) according to Eqs. 19-22 below.

The phase estimation and correction module 1002 in the receiver 1000 estimates the phase offsets in the time domain (i.e., performed before the DFT operation by the DFT module 510 and 512) according to Eqs. 24-26 below. In each of the receivers 900 and 1000, the effect of I-Q imbalance (both magnitude imbalance and phase imbalance) is removed after the operation performed by the phase estimation and correction module 902 or 1002. As a result, the equalization applied by the equalizers 514 and 516 in FIGS. 9 and 10 do not have to compensate for I-Q imbalance, as they have to only equalize for non-ideal channel frequency response by simply scaling the gain of each subcarrier, similar to demodulation performed in the regular OFDM receiver.

As noted above in connection with FIG. 6, to generate the two real time-domain sequences, a and b, two conjugate symmetric sequences A and B are constructed before IDFT in the transmitter. Each conjugate symmetric sequence satisfies Eqs. 5a and 5b. With the modified DC-OFDM applied by the transmitter 600, two subcarriers are selected, the $k_1$-th and $k_2$-th subcarriers, where $k_2 \neq k_1$, $0 \leq k_1 \leq N/2$ and $0 \leq k_2 \leq N/2$, and let $$\begin{cases} A_{k_1} = 0, A_{k_2} \neq 0 \\ B_{k_1} \neq 0, B_{k_2} = 0 \end{cases}, \quad \text{(Eq. 18a)}$$

where the values of $k_1$ and $k_2$ are known by the receiver (900 or 1000 of FIG. 9 or 10). For example, $k_1$ and $k_2$ may be predetermined. In another example, $k_1$ and $k_2$ may be communicated to the receiver.

The following provides an example of a modified DC-OTDM according to some examples.

Assume the following six-point frequency-domain data sequence of 16-QAM symbols, $$S = [3-3j, -3-j, 3+j, 1+3j, -1-3j, 3+3j],$$

from which an eight-point (N=8) DC-OFDM time sequence is to be generated. Taking $k_1 = N/8$ and $k_2 = 3N/8$, the following tasks are performed to construct the DC-OFDM signal.

Task 1: Split S into two non-overlapping subsequences A and B, $$A = [3-3j, -3-j, 3+j],$$

and $$B = [1+3j, -1-3j, 3+3j].$$

Task 2: Move the imaginary part of the first numbers ($0^{th}$ elements) in A and B to the end of each subsequence to satisfy Eq. 5b, to form:

$$A' = [3, -3-j, 3+j, -3],$$

and $$B' = [1, -1-3j, 3+3j, 3].$$

Task 3: Insert a zero in each of the $k_1$-th position of A' and the $k_2$-th position of B', to form:

$$A'' = [3, 0, -3-j, 3+j, -3],$$

and $$B'' = [1, -1-3j, 3+3j, 0, 3].$$

Task 4: Extend each of A'' and B'' to an 8-point conjugate symmetric sequence as indicated by Eq. 5a, to form:

$$A''' = [3, 0, -3-j, 3+j, -3, 3-j, -3+j, 0]$$

and $$B''' = [1, -1-3j, 3+3j, 0, 3, 0, 3-3j, -1+3j].$$

Task 5: Apply an 8-point IDFT on A''' and B''' individually to output two 8-point real time sequences denoted as a and b, respectively.

Task 6: The final complex time sequence is computed as $s = a + jb$.

Alternatively, because of the linearity of IDFT, Tasks 5 and 6 can be changed to the following:
Task 5: Form the complex sequence S=A+jB.
Task 6: Apply 8-point IDFT on S to yield s=a+jb.
Note that (N−2) data symbols can be transmitted by each N-point DC-OFDM signal.

It can be demonstrated that when Eq. 18a is satisfied, $\theta_I$ and $\theta_Q$ in Eqs. 15 and 16 can be estimated in the receiver either in the frequency domain (i.e., after DFT) or in time domain (i.e., before DFT), as long as $|\theta_I|<\pi/2$ and $|\theta_Q|<\pi/2$.

Eq. 18a does not specify particular values $A_{k_1}$ and $B_{k_1}$ should take, as long as they are not zero in general. However, for applications in an environment with noise, $A_{k_2}$ and $B_{k_1}$ should preferably take values with large magnitude in order to maintain good performance of the phase imbalance correction technique. A reasonable choice is to let the symbol energy at each of these two tones equal the maximum symbol energy of the constellation. Thus, the following condition can be applied (which is modified from the condition of Eq. 18a above):

$$\begin{cases} A_{k_1} = 0, A_{k_2} = \sqrt{2}\,S_{max} \\ B_{k_1} = \sqrt{2}\,S_{max}, B_{k_2} = 0 \end{cases} \quad \text{(Eq. 18b)}$$

where $S_{max}$ represents the symbols in the constellation with maximum magnitude.

For instance, when M-QAM modulation (assuming the minimum distance of the constellation is 2) is used, the signal with maximum magnitude is $S_{max}=(\sqrt{M}/2-1)(\pm 1 \pm j)$. Thus, $A_{k_2}$ and $B_{k_1}$ are set to $A_{k_2}=B_{k_1}=\sqrt{2}(\sqrt{M}/2-1)(\pm 1 \pm j)$. For example, for M=64 for 64-QAM, $A_{k_2}=B_{k_1}=\sqrt{2}(7+7j)$.

As another example, when MPSK modulation is used, all of M signal points have equal magnitude. Thus, $S_{max}$ can be any signal point of the constellation in Eq. 18b). In this case, $A_{k_2}$ and $B_{k_1}$ can be used to carry information bits.

Receiver Frequency-Domain Solution

The following describes operations of the receiver 900 of FIG. 9, in which the phase estimation and correction applied by the phase estimation and correction module 902 is performed in the frequency domain.

For a received baseband time-domain sequence $\tilde{s}_n$ (Eq. 14), the real part, $u_n=\text{Re}(\tilde{s}_n)$, and imaginary part, $v_n=\text{Im}(\tilde{s}_n)$, are separated. Next, DFT is applied on each of $u_n$ and $v_n$ individually to yield $U=\{U_k\}$ and $V=\{V_k\}$, respectively. The phase offsets $\theta_I$ and $\theta_Q$ can be estimated respectively as $$\hat{\theta}_I = \text{atan}\frac{V_{k_2}}{U_{k_2}}, \quad \text{(Eq. 19)}$$

and $$\hat{\theta}_Q = \text{atan}\frac{-U_{k_1}}{V_{k_1}}, \quad \text{(Eq. 20)}$$

where a tan(x) stands for the arc tangent of x. Note that in Eq. 19, $U_{k_2}$ and $V_{k_2}$ are affected by the same channel frequency response of the same subcarrier. Thus, after the division, $$\frac{V_{k_2}}{U_{k_2}}$$

of Eq. 19, the effect of the channel response is removed in the estimation of $\theta_I$. This is true also for Eq. 20 in estimation of $\theta_Q$. With estimated $\theta_I$ and $\theta_Q$, $\gamma_I A_k$ and $\gamma_Q B_k$ can be calculated as $$\begin{bmatrix} \gamma_I \hat{A}_k \\ \gamma_Q \hat{B}_k \end{bmatrix} = H \begin{bmatrix} U_k \\ V_k \end{bmatrix}, \quad \text{(Eq. 21)}$$

where $$H = \begin{bmatrix} \cos\hat{\theta}_I & -\sin\hat{\theta}_Q \\ \sin\hat{\theta}_I & \cos\hat{\theta}_Q \end{bmatrix}^{-1} = \frac{\begin{bmatrix} \cos\hat{\theta}_Q & \sin\hat{\theta}_Q \\ -\sin\hat{\theta}_I & \cos\hat{\theta}_I \end{bmatrix}}{\cos(\hat{\theta}_I - \hat{\theta}_Q)}, \quad \text{(Eq. 22)}$$

as long as $|\hat{\theta}_I - \hat{\theta}_Q| < \pi/2$.

From Eqs. 21 and 22, the values of $\gamma_I \hat{A}_k$ and $\gamma_Q \hat{B}_k$ can be derived, which are the estimated frequency-domain data sequences.

More generally, the receiver 900 receives, from a transmitter (e.g., the transmitter 600) and through a channel, a time-domain sequence, where the received time-domain sequence includes an in-phase component ($u_n$), and a quadrature-phase component ($v_n$). As noted above, the transmitted time-domain sequence, as transmitted by the transmitter 600, includes an in-phase component ($a_n$) that is a function of a first conjugate symmetric subsequence (an extended first frequency-domain subsequence that has inserted zero elements) only, and a quadrature-phase component ($b_n$) that is a function of a second conjugate symmetric subsequence (an extended second frequency-domain subsequence that has inserted zero elements) only. However, because of the I-Q phase imbalance, each of the in-phase component ($u_n$), and the quadrature-phase component ($v_n$) of the received time-domain sequence is a mixture of the I component ($a_n$) and Q component ($b_n$) of the transmitted signal. Note that I-Q phase imbalance is in addition to other impairments like channel noise.

The receiver 900 performs a DFT on the $u_n$ and $v_n$ components (of the received time-domain sequence) individually to yield a frequency-domain subsequence $\{U_k\}$ of the received time-domain sequence, and a frequency-domain subsequence $\{V_k\}$ of the received time-domain sequence, respectively. The receiver 900 determines a phase offset ($\hat{\theta}_I$) of the in-phase component of the transmitted time-domain sequence based on the values of $U_{k_2}$ and $V_{k_2}$, and separately determines a phase offset ($\hat{\theta}_Q$) of the quadrature-phase component of the transmitted time-domain sequence based on the values of $U_{k_1}$ and $V_{k_1}$. The receiver 900 then computes the frequency-domain sequences $\{A_k\}$ and $\{B_k\}$ (324) corresponding to the transmitted time-domain sequence using the determined phase offset of the in-phase component, the determined phase offset of the quadrature-phase component, and the values of $U_k$ and $V_k$ for each subcarrier.

The DFT module 510 of the receiver 900 derives a first frequency-domain subsequence from the in-phase component of the received signal, and derives a second frequency-domain subsequence from the quadrature-phase component of the received signal. The phase estimation and correction module 902 determines the phase offset of the in-phase component of the transmitted signal in the frequency domain using a first element (at the $k_2$-th subcarrier) of the derived first frequency-domain subsequence, and a first element (at the $k_2$-th subcarrier) of the derived second frequency-domain subsequence (according to Eq. 19). The phase estimation and correction module 902 determines the phase offset of the quadrature-phase component of the transmitted signal in the frequency domain using a second element (at the $k_1$-th subcarrier) of the derived first frequency-domain subsequence and a second element (at the $k_1$-th subcarrier) of the derived second frequency-domain subsequence (according to Eq. 20).

A possible approximation to replace Eq. 22 is to assume $\hat{\theta}_I = \hat{\theta}_Q$, and use the average value of $\hat{\theta}_I$ and $\hat{\theta}_Q$ for both $\theta_I$ and $\theta_Q$. That is, replace Eq. 22 by $$H \approx \begin{bmatrix} \cos\hat{\theta} & \sin\hat{\theta} \\ -\sin\hat{\theta} & \cos\hat{\theta} \end{bmatrix}, \quad \text{(Eq. 23)}$$

where $\hat{\theta} = (\hat{\theta}_I + \hat{\theta}_Q)/2$. This is possible because often the difference between $\theta_I$ and $\theta_Q$ is quite small. Using Eq. 23 may yield a better performance than using Eq. 22 in an environment when the signal-to-noise ratio (SNR) is low.

The scaling constants $\gamma_I$ and $\gamma_Q$ associated with $\hat{A}_k$ and $\hat{B}_k$ respectively, in Eq. 21 can be estimated based on the received pilot symbols as in a regular OFDM receiver.

As indicated by Eqs. 19 and 20, the frequency-domain solution for estimation of $\theta_I$ and $\theta_Q$ is based on the values of $U_{k_1}$, $U_{k_2}$, $V_{k_1}$ and $V_{k_2}$. No extra effort is expended to obtain these values since these values are already available after the DFT operation on $u_n$ and $v_n$. Thus, the receiver 900 adopting the frequency-domain solution of Eqs. 19-22 is simpler than the receiver 1000 adopting the time-domain solution Eqs. 24-26 below.

Receiver Time-Domain Solution

The following describes operations of the receiver 1000 of FIG. 10, in which the phase estimation and correction applied by the phase estimation and correction module 1002 are performed in the time domain (before application of the DFT).

The received baseband time-domain sequence $\tilde{s}_n$ (Eq. 14) is separated into the real part, $u_n = \text{Re}(\tilde{s}_n)$, and imaginary part, $v_n = \text{Im}(\tilde{s}_n)$. Then, $\theta_I$ and $\theta_Q$ can be estimated respectively as $$\hat{\theta}_I = \text{atan} \frac{\sum_{n=0}^{N-1} v_n \exp\left(-j\frac{2\pi k_2 n}{N}\right)}{\sum_{n=0}^{N-1} u_n \exp\left(-j\frac{2\pi k_2 n}{N}\right)}, \quad \text{(Eq. 24)}$$

and $$\hat{\theta}_Q = \text{atan} \frac{-\sum_{n=0}^{N-1} u_n \exp\left(-j\frac{2\pi k_1 n}{N}\right)}{\sum_{n=0}^{N-1} v_n \exp\left(-j\frac{2\pi k_1 n}{N}\right)}. \quad \text{(Eq. 25)}$$

More generally, the phase estimation and correction module 1002 determines, in the time domain, the phase offset ($\hat{\theta}_I$) of the in-phase component of the transmitted time-domain sequence, and separately determines, in the time domain, the phase offset ($\hat{\theta}_Q$) of the quadrature-phase component of the transmitted time-domain sequence.

With estimated $\hat{\theta}_I$, and $\hat{\theta}_Q$, from Eq. 19, $\gamma_I a_n$ and $\gamma_Q b_n$ can be calculated as $$\begin{bmatrix} \gamma_I \hat{a}_n \\ \gamma_Q \hat{a}_n \end{bmatrix} = H \begin{bmatrix} u_n \\ v_n \end{bmatrix}, \quad \text{(Eq. 26)}$$

as long as $|\hat{\theta}_I - \hat{\theta}_Q| < \pi/2$.

Again, the scaling constants $\gamma_I$ and $\gamma_Q$ associated with $\hat{a}_n$ and $\hat{b}_n$ respectively in Eq. 26 can be estimated based on the received pilot symbols as in a regular OFDM receiver.

Estimating $\gamma_I$ and $\gamma_Q$

When the DC-OFDM signal satisfies the condition of Eq. 18a, in which $A_{k_1}$ and $B_{k_2}$ are set to zero, and $A_{k_2}$ and $B_{k_1}$ are set to non-zero values, the phase imbalance represented by $\theta_I$ and $\theta_Q$ can be estimated using the proposed solutions in the frequency domain or time domain. Once the phase offsets $\theta_I$ and $\theta_Q$ are computed, $\gamma_I A_k$ and $\gamma_Q B_k$, or $\gamma_I a_n$ and $\gamma_Q b_n$, can be estimated, respectively, by the receiver 900 or 1000.

However, $\gamma_I$ and $\gamma_Q$ cannot be estimated directly if the receiver does not know the magnitudes of $A_{k_2}$ and $B_{k_1}$. Instead, as mentioned above, they are assumed to be estimated based on the received pilot symbols as in a regular OFDM receiver. In practical applications in environments with noise, Eq. 18b should preferably be used in the transmitter for enhanced performance. When Eq. 18b is used, the magnitudes of $A_{k_2}$ and $B_{k_1}$ are known by the receiver. Thus, an additional benefit of this is that the magnitude imbalance can be estimated as follows:

$$\hat{\gamma}_I = \frac{|U_{k_2}|}{|A_{k_2}||\cos\hat{\theta}_I|} = \frac{|V_{k_2}|}{|A_{k_2}||\sin\hat{\theta}_I|}, \quad \text{(Eq. 27)}$$

and $$\hat{\gamma}_Q = \frac{|U_{k_1}|}{|B_{k_1}||\sin\hat{\theta}_Q|} = \frac{|V_{k_1}|}{|B_{k_1}||\cos\hat{\theta}_Q|}. \quad \text{(Eq. 28)}$$

Note that for this purpose, the receiver has to know the magnitudes of $A_{k_2}$ and $B_{k_1}$, which are predetermined and known by the receiver when Eq. 18b is used.

With the modified DC-OFDM solutions according to some implementations of the present disclosure, the I-Q phase imbalance can be estimated for a DC-OFDM signal and its impact can be removed at a small overhead cost. The modified DC-OFDM solutions take advantage of the fact that the I and Q components in the time domain are decoupled, such that the I component (in the time domain) is determined only by the sequence A (in the frequency domain), and the Q component (in the time domain) is determined only by the sequence B (in the frequency domain). Thus, by muting one subcarrier in A and muting another subcarrier in B, the phase imbalance represented by $\theta_I$ and $\theta_Q$ can be estimated separately and individually, thereby making the processing simpler. The purpose of muting one tone in each of sequences A and B to zero is to be able to separately estimate the two phase parameters $\theta_I$ and $\theta_Q$.

Various components (e.g., generators 406, 408, 606, 608, muters 607, 609, phase estimation and correction modules 902, 1002, and other components) of the transmitters and receivers discussed herein can be implemented as hardware processing circuits or combinations of hardware processing circuits and machine-readable instructions.

Machine-readable instructions can be stored in non-transitory machine-readable storage media. A storage medium can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An apparatus comprising:
a transmitter configured to:
apply input data as a frequency-domain data sequence to modulate a set of subcarriers;
separate the frequency-domain data sequence into a first subsequence of elements and a second subsequence of elements;
apply muting that comprises forming a modified first subsequence by inserting a zero value into the first subsequence, and forming a modified second subsequence by inserting a zero value into the second subsequence, the zero values inserted at different positions in the first and second subsequences;
after the muting, extend the modified first subsequence to a first conjugate symmetric subsequence that has a larger number of elements than the modified first subsequence, and extend the modified second subsequence to a second conjugate symmetric subsequence that has a larger number of elements than the modified second subsequence; and
generate a time-domain sequence comprising a first component that is a function of the first conjugate symmetric subsequence, and a second component that is a function of the second conjugate symmetric subsequence.

2. An apparatus comprising:
a transmitter configured to:
apply input data as a frequency-domain data sequence to modulate a set of subcarriers;
separate the frequency-domain data sequence into a first subsequence of elements and a second subsequence of elements;
form a modified first subsequence by inserting a zero value into the first subsequence, and form a modified second subsequence by inserting a zero value into the second subsequence, the zero values inserted at different positions in the first and second subsequences;
extend the modified first subsequence to a first conjugate symmetric subsequence, and extend the modified second subsequence to a second conjugate symmetric subsequence,
wherein extending the modified first subsequence to the first conjugate symmetric subsequence comprises setting the $0^{th}$ element of the modified first subsequence to a real number, and setting the $(N/2-1)^{th}$ element of the modified first subsequence to a real number, and
wherein extending the modified second subsequence to the second conjugate symmetric subsequence comprises setting the $0^{th}$ element of the modified second subsequence to a real number, and setting the $(N/2-1)^{th}$ element of the modified second subsequence to a real number; and
generate a time-domain sequence comprising a first component that is a function of the first conjugate symmetric subsequence, and a second component that is a function of the second conjugate symmetric subsequence.

3. The apparatus of claim 1, wherein the transmitter is configured to transmit the time-domain sequence over a communication medium to a receiver.

4. The apparatus of claim 1, wherein the first component comprises an in-phase (I) component, and the second component comprises a quadrature-phase (Q) component.

5. The apparatus of claim 4, wherein the transmitter is configured to apply I-Q decoupled orthogonal frequency division multiplexing (OFDM) modulation to mitigate I-Q imbalance.

6. The apparatus of claim 4, wherein the generated time-domain sequence is a complex time-domain sequence.

7. The apparatus of claim 1, wherein the transmitter is configured to apply an inverse discrete Fourier transform (IDFT) on the first conjugate symmetric subsequence and on the second conjugate symmetric subsequence,
the IDFT applied individually on the first conjugate symmetric subsequence and on the second conjugate symmetric subsequence, or the IDFT applied on a complex sequence formed from the first conjugate symmetric subsequence and the second conjugate symmetric subsequence.

8. An apparatus comprising:
a transmitter configured to:
apply input data as a frequency-domain data sequence to modulate a set of subcarriers;
separate the frequency-domain data sequence into a first subsequence of elements and a second subsequence of elements;
apply muting that comprises forming a modified first subsequence by inserting a zero value into the first subsequence, and forming a modified second subsequence by inserting a zero value into the second subsequence, the zero values inserted at different positions in the first and second subsequences,
wherein a muted subcarrier for the first subsequence is at a first subcarrier frequency, and a muted subcarrier for the second subsequence is at a second subcarrier frequency different from the first subcarrier frequency, and wherein forming the modified second subsequence comprises setting an element of the second subsequence at the first subcarrier frequency to a specified non-zero value to form the modified second subsequence, wherein forming the modified first subsequence comprises setting an element of the first subsequence at the second subcarrier frequency to the specified non-zero value to form the modified first subsequence; and form a first conjugate symmetric subsequence based on the modified first subsequence, and form a second conjugate symmetric subsequence based on the modified second subsequence; and generate a time-domain sequence comprising a first component that is a function of the first conjugate symmetric subsequence, and a second component that is a function of the second conjugate symmetric subsequence.

9. The apparatus of claim 8, wherein the specified non-zero value is based on a maximum amplitude of a symbol in a constellation used by a modulation scheme for modulating the set of subcarriers.

10. An apparatus comprising:
a receiver comprising an antenna and a radio frequency circuit to receive a transmitted time-domain sequence transmitted by a transmitter of a device over a communication medium, the receiver configured to:
receive a received time-domain sequence that is responsive to the transmitted time-domain sequence transmitted by the transmitter, the transmitted time-domain sequence comprising an in-phase component that is a function of a first frequency-domain subsequence that has an inserted zero element, and a quadrature-phase component that is a function of a second frequency-domain subsequence that has an inserted zero element;
determine a phase offset of the in-phase component of the transmitted time-domain sequence;
separately determine a phase offset of the quadrature-phase component of the transmitted time-domain sequence;
compute a frequency-domain sequence corresponding to the transmitted time-domain sequence using the determined phase offset of the in-phase component of the transmitted time-domain sequence and the determined phase offset of the quadrature-phase component of the transmitted time-domain sequence; and
generate a data bit stream using the frequency-domain sequence, the data bit stream comprising data that is communicated between the device and the apparatus over the communication medium.

11. The apparatus of claim 10, wherein the receiver is configured to further:
derive a first frequency-domain subsequence of the received time-domain sequence from an in-phase component of the received time-domain sequence;
derive a second frequency-domain subsequence of the received time-domain sequence from a quadrature-phase component of the received time-domain sequence;
determine the phase offset of the in-phase component of the transmitted time-domain sequence in the frequency domain using a first element of the derived first frequency-domain subsequence of the received time-domain sequence, and a first element of the derived second frequency-domain subsequence of the received time-domain sequence; and
determine the phase offset of the quadrature-phase component of the transmitted time-domain sequence in the frequency domain using a second element of the derived first frequency-domain subsequence of the received time-domain sequence, and a second element of the derived second frequency-domain subsequence of the received time-domain sequence.

12. The apparatus of claim 11, wherein the deriving of the derived first frequency-domain subsequence from the in-phase component of the received time-domain sequence comprises applying a discrete Fourier transform (DFT) to the in-phase component of the received time-domain sequence, and wherein the deriving of the derived second frequency-domain subsequence from the quadrature-phase component of the received time-domain sequence comprises applying a DFT to the quadrature-phase component of the received time-domain sequence.

13. The apparatus of claim 10, wherein the receiver is configured to compute an aggregate of the phase offset of the in-phase component of the transmitted time-domain sequence and the phase offset of the quadrature-phase component of the transmitted time-domain sequence to derive an aggregate phase offset, and wherein the computing of the frequency-domain sequence corresponding to the transmitted time-domain sequence uses the aggregate phase offset.

14. The apparatus of claim 13, wherein the aggregate is an average of the determined phase offset of the in-phase component of the transmitted time-domain sequence, and the determined phase offset of the quadrature-phase component of the transmitted time-domain sequence.

15. The apparatus of claim 10, wherein the receiver is configured to:
determine, in the time domain, the phase offset of the in-phase component of the transmitted time-domain sequence;
separately determine, in the time domain, the phase offset of the quadrature-phase component of the transmitted time-domain sequence.

16. The apparatus of claim 10, wherein phase imbalance is present in the received time-domain sequence due to the phase offset of the in-phase component of the transmitted time-domain sequence being different from the phase offset of the quadrature-phase component of the transmitted time-domain sequence.

17. The apparatus of claim 10, wherein the receiver is configured to further:
determine a magnitude imbalance of the received time-domain sequence using the determined phase offset of the in-phase component of the transmitted time-domain sequence and the determined phase offset of the quadrature-phase component of the transmitted time-domain sequence.

18. The apparatus of claim 1, wherein the transmitter comprises an antenna to transmit a radio frequency signal carrying the time-domain sequence over a communication medium to a receiver.

19. The apparatus of claim 2, wherein the transmitter comprises an antenna to transmit a radio frequency signal carrying the time-domain sequence over a communication medium to a receiver.

20. The apparatus of claim 8, wherein the transmitter comprises an antenna to transmit a radio frequency signal carrying the time-domain sequence over a communication medium to a receiver.

* * * * *